United States Patent
Cadiou, Sean

[15] 3,697,093

[45] Oct. 10, 1972

[54] ARRANGEMENT FOR SECURING A CONTAINER TO A VEHICLE

[72] Inventor: Sean Cadiou, Paris France

[73] Assignee: Ste. An. Automobiles Citroen, Paris, France

[22] Filed: March 8, 1971

[21] Appl. No.: 121,878

[30] Foreign Application Priority Data

March 13, 1970 France.....................7009234

[52] U.S. Cl. .............................280/5 A, 280/179 A
[51] Int. Cl. ............................................B60p 3/22
[58] Field of Search.........................280/5 A, 179 A

[56] References Cited

UNITED STATES PATENTS

| | | |
|---|---|---|
| 1,649,265 | 11/1927 | Tetens.....................280/5 A |
| 1,840,136 | 1/1932 | Skelton..................280/5 A X |
| 2,846,231 | 8/1958 | Fritz..........................280/5 A |
| 3,014,730 | 12/1961 | Cole..........................280/5 A |

Primary Examiner—Leo Friaglia
Attorney—Karl F. Ross

[57] ABSTRACT

A gasoline tank or like container is fastened to a vehicle, say to the lower surface of a floor-board, by means of yielding straps whose ends of which are secured to the floor-board or like support and engage in grooves formed in the side walls and bottom of the container in parallel vertical planes. The grooves form ribs along the inner surface of the container so as to partition partly the inside of the latter and have a depth which, measured vertically, decreases across the bottom of the container from the side wall towards the center of its bottom.

9 Claims, 4 Drawing Figures

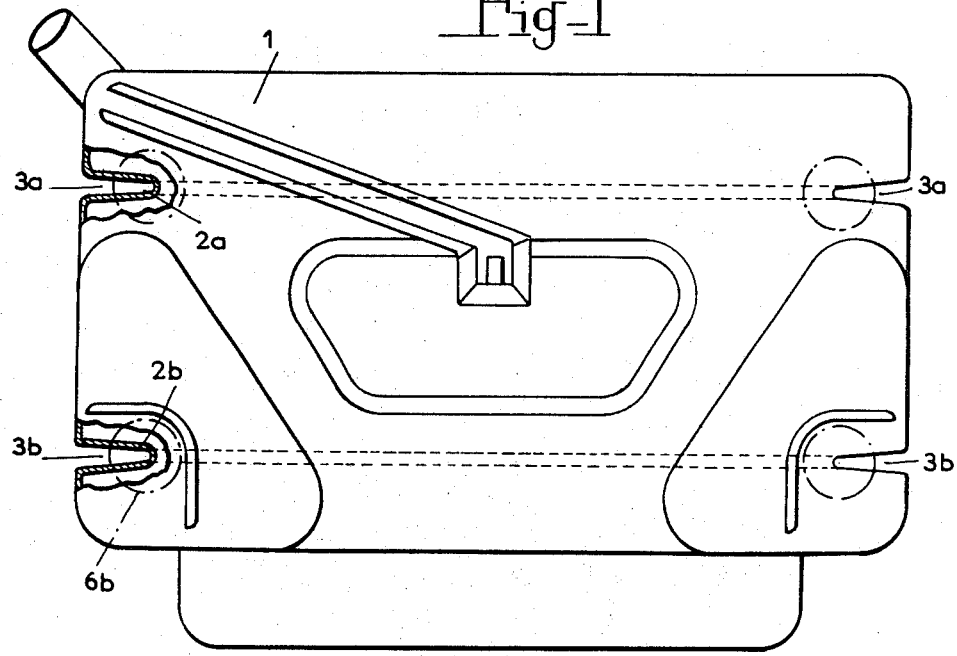
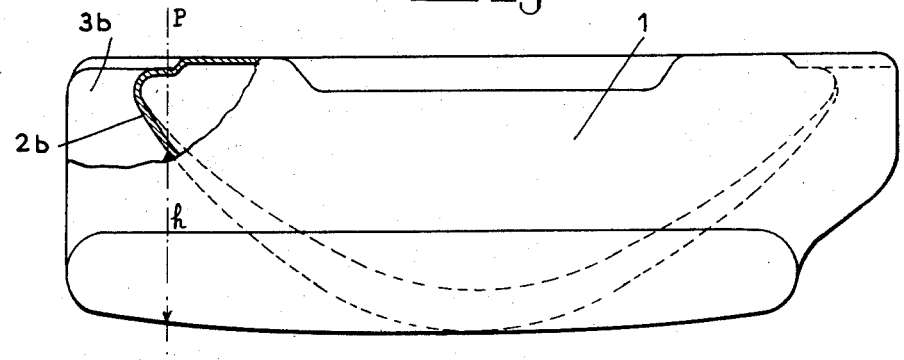
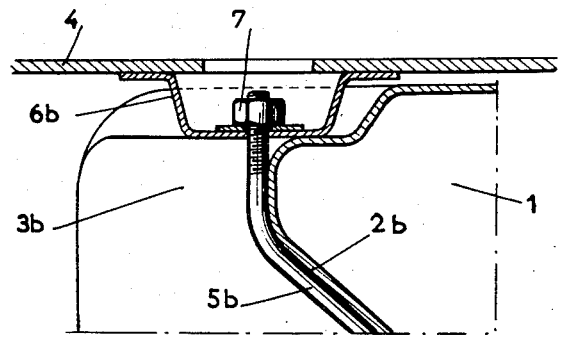

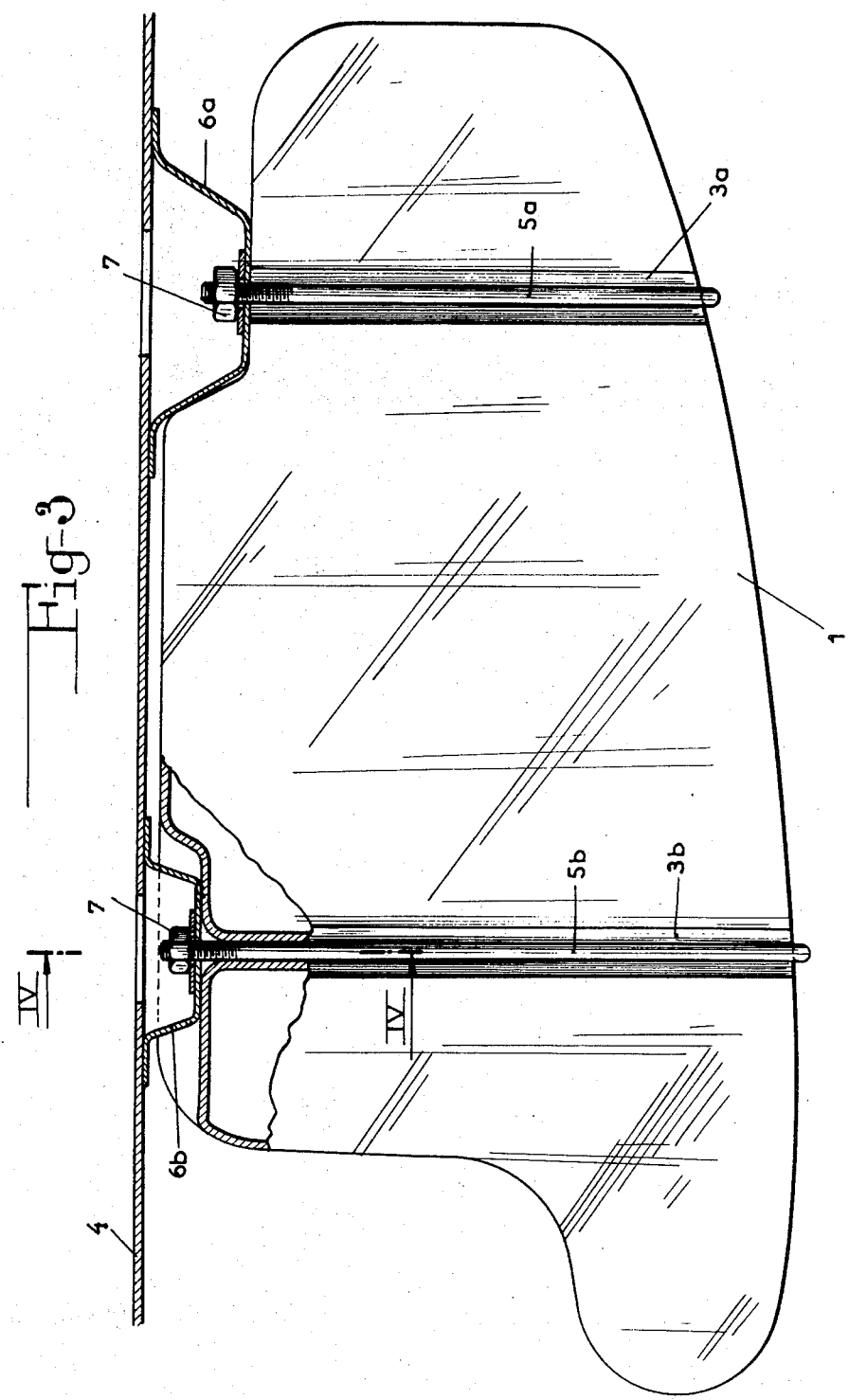

ARRANGEMENT FOR SECURING A CONTAINER TO A VEHICLE

It has already been proposed to produce gasoline containers made of plastics for power-driven vehicles, chiefly automobiles. In fact, such containers may assume various sometimes intricate shapes allowing them to occupy any limited available space.

In the arrangements known hitherto, the container was secured by straps to the chassis or body of the vehicle, which subjected generally the container to deformations or, else the container was housed within a chamber. However, spaces large enough to house the container can be found only within the body of the vehicle, say inside a cross-beam or casing extending under the seats and connecting the side members together, which requires solving certain problems as to safety.

My present invention has for its object the provision improved means for securing a container made of plastics to the chassis or to the body of the vehicle through a suspension strap whereby the above drawbacks are removed.

According to the invention, the container is provided with at least one inner rib forming a portion of a partition stamped out of the outer surface of the container together with a peripheral groove in the outer transverse surface of the container; the depth of this groove, measured in a vertical plane perpendicular to the ribs, decreases from the outer transverse surface of the container toward its medial transverse plane while the strap engages in groove and abuts at least partly against the bottom of the latter.

I shall now describe hereinafter by way of example and in a non-limiting sense an embodiment of the invention with reference to the accompanying drawings wherein:

FIG. 1 is a view, with parts broken away of the container as seen from above;

FIG. 2 is an elevational view thereof, also partly broken away.

FIG. 3 shows the container as secured underneath the floor-board of the vehicle body; and FIG. 4 shows a detail in cross-sectional view on line IV—IV of FIG. 3.

As illustrated, 1 designates a container made of plastic material and provided with two pairs of inwardly directed reinforcing ribs 2a and 2b extending in parallel vertical planes in registry with these ribs; the thickness of the container wall remains substantially constant, so that the ribs thus stamped inwardly form two pairs of outer grooves 3a and 3b, the two grooves of the same pair being coplanar. The depth h of the grooves, measured in a vertical plane such as P which is perpendicular to the planes defined by the grooves, decreases from periphery of the container toward its center. In the example illustrated, this depth is practically nil in the medial transverse plane of the container, the two grooves of each pair merging into each other on the medial transverse line of the container bottom. This ensures the interconnection between the lower parts of the compartments defined within the container by the ribs. The depth need not however, quite reach a zero value, the ribs 2a and 2b projecting then by a few millimeters into the inside of the container in its medial transverse plane. The volume of fuel enclosed between the ribs is extremely small and the fuel may readily pass out of one compartment into the next under the action of the movements of the vehicle.

The container 1 is urged into contact with the lower surface of the floor-board 4 of the vehicle, the upper container surface matching the shape of the floor-board which latter may be provided with ribs or with stamped-out reinforcements. The container is held in position by straps 5a and 5b fitted inside the grooves 3a and 3b substantially into engagement with the bottom of the grooves. The ends of the straps are secured to the floor-board 4. These straps may be constituted by round metal rods, bare or coated with plastic or material, or by a stamped iron profile whose cross-section matches that of the groove, or again by a yielding member such as a cable enclosed inside a sheath of rubber or plastic. In the example illustrated, each strap is constituted by a metal rod whose ends are threaded, the rods extending through the downwardly directed ribs 6a and 6b rigid with the floor-board while nuts 7 screwed onto the rods 5a and 5b hold the latter fast with reference to the floor-board ribs.

As will be apparent from the above, the ribs 2a and 2b play a three-fold part: they strengthen the container 1, they partition it inwardly so as to limit the transverse movements of the fuel, and they form recesses holding the straps in position. Furthermore, the straps cooperate in mechanically stabilizing the container which is further stiffened by them whereas, on the other hand, the container stiffens the floor since it is urged hard against the latter.

Obviously, the invention is by no means limited to the embodiment described and illustrated but covers all the modifications thereof falling within the scope of the accompanying claims. In particular, the straps need not lie against the bottom of the grooves throughout the length of the latter.

What I claim is:

1. A unit to be secured to a vehicle, comprising a container made of plastic material and provided with at least one rib projecting inwardly in a vertical plane from a pair of opposite lateral walls and from the bottom of the container to form inside the container a partial vertical partition and in the outer surface of the container a groove whose depth measured vertically in said plane decreases toward the container bottom, and strap secured to the vehicle and engaging in said groove.

2. A unit as claimed in claim 1 wherein the depth of the groove decreases gradually over a part of its entire length.

3. A unit as claimed in claim 1 wherein the depth of the groove decreases gradually throughout its length.

4. A unit as claimed in claim 1 wherein the container is provided with pair of grooves extending in parallel vertical planes, the depth of each groove decreasing to substantially zero at a point approximately equidistant from said lateral walls.

5. A unit as claimed in claim 1 wherein the container is a gasoline tank, said strap being secured to the foot-board of the vehicle and urging said container upwardly against the lower surface of a foot-board.

6. A unit as claimed in claim 1 wherein said strap is constituted by a shaped metal rod.

7. A unit as claimed in claim 1 wherein said strap is constituted by a strip of sheet metal conforming to the cross-sectional outline of said groove.

8. A unit as claimed in claim 1 wherein said strap is constituted by a yieldable elongated member.

9. A unit as claimed in claim 1 wherein each strap is constituted by a sheathed cable.

* * * * *